March 5, 1963 J. L. SMITH, JR 3,080,530

NONRECIPROCAL COAXIAL LINE NEGATIVE RESISTANCE AMPLIFIER

Filed Oct. 31, 1961

INVENTOR.
JULIUS L. SMITH JR.
BY Moody and Antrim
AGENTS

United States Patent Office 3,080,530
Patented Mar. 5, 1963

3,080,530

NONRECIPROCAL COAXIAL LINE NEGATIVE RESISTANCE AMPLIFIER

Julius L. Smith, Jr., Richardson, Tex., assignor to Collins Radio Company, Cedar Rapids, Iowa, a corporation of Iowa Filed Oct. 31, 1961, Ser. No. 148,923
7 Claims. (Cl. 330—61)

This invention pertains to nonreciprocal high-frequency amplifiers and particularly to coaxial line sections that utilize amplifying devices to provide greater amplification in one direction of transmission than in the other. Certain types of semiconducting diodes, such as those known as tunnel diodes, exhibit negative conductance over part of their voltage current characteristic curves in a forward conducting sense. When a diode of this type is biased within the negative-conductive portion of its curve, it can convert direct-current energy into high-frequency signal to increase the amplitude of high-frequency signal which is applied to a transmission line connected to the diode. When an amplifier using a diode is compared with that using electron tubes or transistors, the diode amplifier is superior because of its low level of noise and good gain for signals having frequencies above 1000 megacycles.

In negative-conductance diode amplifiers, special circuits must be utilized to prevent instability resulting from feed-back. The inherent construction of vacuum tubes and transistors prevents very much reflection of energy from their output circuits to their input circuits. In the present invention, a negative-conductive diode is connected at a point of discontinuity of impedance in a coaxial cable. The impedance across the diode for one direction of propagation of high-frequency signal through the coaxial cable is different from the impedance for the opposite direction of propagation. The power levels supplied by the diode are different for signals flowing in the opposite direction even though their input voltage levels are the same. The diode supplies greater energy to that signal flowing in that direction in which the impedance at the discontinuity is lower.

An object of the present invention is to utilize a low-noise negative-conductive device in a nonreciprocal high-frequency amplifier.

A feature of the invention is the utilization of a tapered coaxial line to provide bias to a negative-conductive device without disturbing the impedance of the coaxial circuit to which the negative-conductive device is connected.

The following description and the appended claims may be more readily understood with reference to the accompanying drawings in which:

Figure 1:
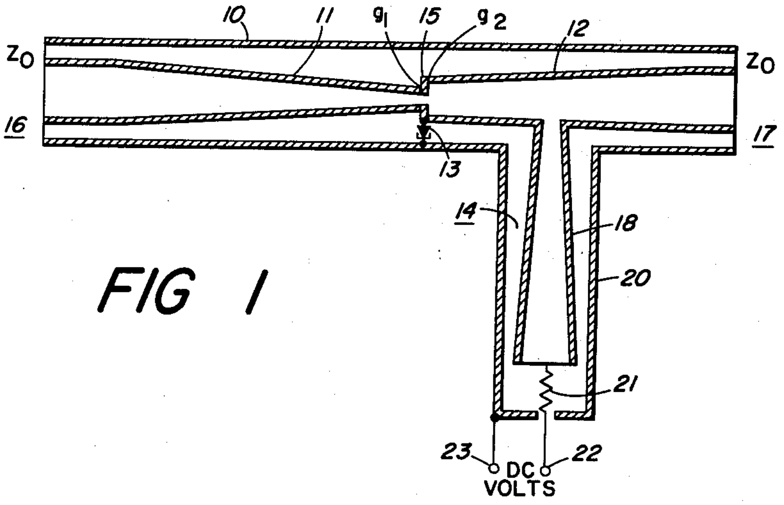
FIG. 1 is a sectional drawing of a nonreciprocal amplifier of this invention having the inner conductor of a coaxial cable shaped to provide discontinuity and a tapered coaxial line for connecting bias voltage to a diode.

The embodiment of the invention shown in FIG. 1 comprises an outer cylindrical conductor 10, an inner conductor consisting of tapered sections 11 and 12, a tunnel diode 13 connected between the junction of the tapered sections and the outer conductor, and a tapered line section 14 for connecting bias voltage to the tunnel diode. The tapered sections 11 and 12 are frustums coaxially mounted by usual insulating means (not shown) within the outer conductor 10.

The diameters of the adjacent ends of the frustums are slightly different. These ends are joined by a ring 15 of conductive material to continue the wall of the inner conductor transversely through the ring. The outer ends of the conical sections 11 and 12 terminate in cylindrical sections to provide the required impedance $Z_0$ at the outer ends 16 and 17 of the coaxial cable section. The tunnel diode 13 is connected between the junction of the frustums and the outer wall. The impedance across the diode is different for one direction of signal flow through the coaxial section than it is for the other direction of signal flow. As shown mathematically below, the differences in impedance, or conductance, cause different degrees of amplification from diode 13 for the different directions of signal flow.

The line for applying bias voltage to the tunnel diode from a low-impedance source must provide a high-impedance junction at the coaxial cable in order to prevent excessive losses of signal. The bias line section 14 comprises an outer cylindrical conductor 20 joined to the outer conductor 10 of the coaxial cable. The inner conductor 18 is a conical or tapered section coaxially mounted within the outer conductor 20. The smaller end of the inner conductor of the bias line is joined to one of the inner sections 11 and 12 of the coaxial cable. The outer end of the tapered inner conductor which has the larger diameter to provide low impedance is connected through matching resistor 21 to terminal 22 of a source of direct-current voltage bias. The other terminal 23 of the source is connected to the outer conductor 20 of the bias line for applying the voltage to the outer conductor 10 of the coaxial cable section. The source of bias voltage has the required value and is connected in the proper sense to provide forward current flow through diode 13 within its negative-conductive range of operation.

The direction and the degree of taper of each of the conical sections 11 and 12 of the inner conductor of the cable are dependent upon the impedances of the terminations of the coaxial cable and the conductance of tunnel diode 13. The sum of the two different values of conductance at junction 15 for the different directions of flow of signal has approximately the same absolute value as the negative conductance of the tunnel diode 13.

Figure 2:
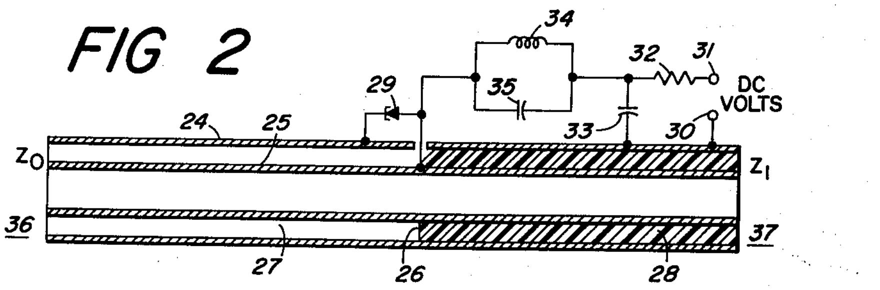
FIG. 2 is a nonreciprocal amplifier in which discontinuity of impedance is provided by an abrupt transition of dielectric between the inner and outer conductors.

A nonreciprocal coaxial cable according to FIG. 2 has a discontinuity of impedance provided by an abrupt transition in the dielectric that is disposed between the inner and outer conductors of the cable. A uniform cylindrical inner conductor 25 is coaxially mounted within the cylindrical outer conductor 24. The space between the inner and outer conductors at the left of the junction 26 is filled with dielectric 27, and the space to the right of junction 26 is filled with a different dielectric 28. Dielectric 27 may be air and dielectric 28 may be a low loss dielectric material.

When the impedance at end 36 of the coaxial cable is $Z_0$, the impedance $Z_1$ at the opposite end 37 of the section having a medium with a dielectric constant greater than that of air, is smaller than $Z_0$. The impedance of either end may be transformed by usual methods as required to match the impedance of its termination.

The tunnel diode 29 is connected between the inner conductor 25 and the outer conductor 24 at the junction 26 of the two different dielectrics 27 and 28. A source of direct-current voltage for biasing tunnel diode 29 in that direction for obtaining negative conductance is connected between the inner and outer conductors. Terminal 30 of the source of bias voltage is connected to the outer conductor 24, and terminal 31 of the source is connected through dropping resistor 32 and inductor 34 to the inner conductor 25. Capacitor 33 connected between the outer conductor 24 and the junction of resistor 32 and inductor 34, is a usual filter capacitor. Capacitor 35 connected in parallel with inductor 34 tunes the parallel combination to the frequency of the signal which is being propagated by the coaxial cable to provide high impedance to the signal so that the bias circuit does not absorb excessive energy from the propagated signal.

Figure 3:
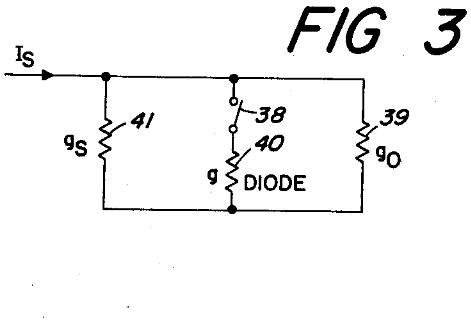
FIG. 3 is a simplified functional diagram of a simple negative-conductance circuit to aid in deriving a formula for gain.

According to mathematical analysis the gain is different for different directions of propagation of signal through the nonreciprocal coaxial cables described above. With reference to FIG. 3, fundamental power formulas may be used to show the output power received by load 39. When the input current is $I_s$ and the switch 38 is open the power absorbed by load 39 is $$\frac{I_s^2}{4g_o}$$

According to the usual practice for obtaining maximum power transfer, the conductance $g_s$ of the input circuit 41 is assumed to be equal to the conductance $g_o$ of the output circuit 39.

When the switch 38 is closed, the negative-conductance $g$ of the diode 40 is placed in parallel with the conductance $g_s$ of the input circuit 41 and the conductance $g_o$ of the output circuit 39. The output power received by the load 39 becomes $$\left(\frac{I_s}{g_o+g_s+g}\right)^2 g_o$$

The power gain is defined as the ratio of the output power when switch 38 is closed to the power output when the switch is open. This ratio expressed in conductance values is $$\left(\frac{2g_o}{g_o+g_s+g}\right)^2$$

With reference to FIG. 1, the tunnel diode 13 operates into conductance $g_1$ for signal flow toward end 16 of the coaxial conductor and operates into conductance $g_2$ for signal flow toward end 17 of the coaxial conductor. Then the term $g_o$ in the numerator of the equation that is shown above for power gain is equal to $g_2$ for propagation from end 16 to end 17 and is equal to $g_1$ for propagation in the opposite direction. Since the denominator is the same for each direction of propagation, the ratio of the gain for propagation toward end 17 to the gain in the opposite direction is $$\left(\frac{g_2}{g_1}\right)^2$$

Gain has been measured on a section designed according to FIG. 1 when the injected signal had a frequency of 500 megacycles per second and the dimensions of the coaxial cable provide input and output impedances of 50 ohms. The gain from end 16 to end 17 was 6.0 decibels and the gain in the opposite direction was only 0.25 decibels. The ratio of the gain was consistent with that calculated from the conductance values for $g_1$ and $g_2$ at the point of discontinuity of impedance as derived from the dimensions of the inner and outer conductors at that point.

K. K. N. Chang has discussed the advantage of a tunnel diode amplifier with respect to the generation of noise in his article "Low-Noise Tunnel-Diode Amplifier" published in the July 1959 issue of the Proceedings of the Institute of Radio Engineers. According to his teaching, the noise of the amplifiers described above varies directly with the ratio $g_1/g_2$. A low-noise figure can be expected when this ratio is small.

The low-noise and nonreciprocal characteristics of amplifiers according to this invention provide improved operation in low-level signal circuits in which the noise is to be maintained at a minimum and signal reflected from the output to the input is to be attenuated. When the amplifier is a radio-frequency stage of a superheterodyne receiver, a favorable signal-to-noise ratio is obtained; the nonreciprocal operation prevents excessive radiation of the locally generated signal which is applied to a succeeding mixer stage. Nonreciprocal amplifiers may have different configurations of coaxial conductors from those shown in the accompanying drawings and may utilize different negative-conductive devices and still be within the spirit and scope of the following claims.

I claim:

1. A nonreciprocal negative-resistance amplifier comprising, a coaxial cable and a negative-conductive device, said coaxial cable having first and second lengths with different respective characteristic impedances, said lengths being joined end to end on substantially a transverse plane to provide a discontinuity of impedance at the junction of said lengths, said cable having an inner conductor and an outer conductor, said negative-conductive device being connected between said conductors at the junction of said lengths, a source of voltage, and high-impedance means for connecting said source of voltage between said conductors to bias said negative-conductive device.

2. A coaxial cable having nonreciprocal transmission characteristics comprising, an outer conductor, an inner coaxial conductor, the relative dimensions of the cross sections of said conductors being abruptly modified at a point along the cable to provide a discontinuity of impedance, a negative-conductive device connected between said conductors at said point of discontinuity, a source of voltage, and high-impedance means for connecting said source of voltage between said conductors to bias said negative-conductive device.

3. A coaxial cable having nonreciprocal transmission characteristics comprising, an outer conductor, an inner coaxial conductor, a first dielectric disposed between said inner and said outer conductors along a part of said coaxial cable and a second dielectric disposed between said inner and outer conductors along an adjoining part of said coaxial cable, the transition along the cable from said first dielectric to said second dielectric being abrupt to provide a point of discontinuity of impedance, a negative-conductive device connected between said conductors at said point of discontinuity, a source of voltage, and high-impedance means for connecting said source of voltage between said conductors to bias said negative-conductive device.

4. A nonreciprocal negative-resistance amplifier comprising, a coaxial cable having inner and outer conductors, said inner conductor having an abrupt change in cross section to cause a discontinuity of impedance, a negative-conductive device connected between said outer conductor and said inner conductor at the point of said discontinuity, said inner conductor being tapered as required in each direction from said point of discontinuity to provide required respective matching impedance values for said negative-conductive device and for terminations at the ends of said coaxial cable, a source of bias voltage, and high-impedance means for connecting said source of voltage between said inner and outer conductors of said coaxial cable to bias said negative-conductive device as required for obtaining negative conduction between said inner conductor and said outer conductor.

5. A coaxial cable having nonreciprocal transmission characteristics comprising, an outer conductor having uniform cross section, an inner conductor having first and second tapered sections, a tunnel diode, the cross sections of the adjacent ends of said tapered sections having similar shape but different size, said adjacent ends being joined by a transverse wall to provide discontinuity of impedance, said tunnel diode being connected between said outer conductor and the junction of said sections of said inner conductor, each of said sections having a taper as required for providing impedance at said junction suitable for operation of said tunnel diode and for providing required matching impedance at opposite ends of said joined tapered sections, a source of biasing voltage, and high-impedance means for connecting said source of voltage between said inner and outer conductors of said coaxial cable, said voltage and said diode being connected in their proper senses to cause forward current flow between said inner and said outer conductor as required for negative conduction of said diode.

6. A coaxial cable having nonreciprocal transmission characteristics comprising, a cylindrical outer conductor having uniform diameter, an inner conductor including first and second frustums joined at their smaller ends for obtaining discontinuity of impedance, a tunnel diode electrically connected between the junction of said frustums and the adjacent wall of said outer conductor, said frustums being coaxially disposed within said outer conductor, said smaller ends having different diameters as required for obtaining a different value of impedance at said junction for each direction of signal flow in said coaxial cable, said smaller ends being substantially concentric and being circumferentially joined by a transverse section for completing the walls of said inner conductor, a source of voltage for biasing said tunnel diode to obtain negative conductance thereof, and high-impedance means for connecting said source of bias between said inner and outer conductors of said coaxial cable to provide forward conduction through said diode.

7. A coaxial cable according to claim 6 in which said high-impedance means is a tapered coaxial-line bias section having its inner and outer conductors at its high-impedance end joined to said inner and outer conductors of said coaxial conductor, and said source of voltage being connected between the conductors of said bias section at its low-impedance end.

No references cited.